US012747391B2

(12) United States Patent
Glaser et al.

(10) Patent No.: US 12,747,391 B2
(45) Date of Patent: Sep. 29, 2026

(54) COMPOSITE MATERIALS BASED ON FERROELECTRIC NEMATIC LIQUID CRYSTALS AND DEVICES INCLUDING SAME

(71) Applicant: The Regents of the University of Colorado, Denver, CO (US)

(72) Inventors: Matthew A. Glaser, Boulder, CO (US); Noel A. Clark, Boulder, CO (US); Joseph E. Maclennan, Boulder, CO (US); Xi Chen, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 18/727,990

(22) PCT Filed: Jan. 10, 2023

(86) PCT No.: PCT/US2023/010510

§ 371 (c)(1),
(2) Date: Jul. 10, 2024

(87) PCT Pub. No.: WO2023/133356

PCT Pub. Date: Jul. 13, 2023

(65) Prior Publication Data

US 2025/0075128 A1 Mar. 6, 2025

Related U.S. Application Data

(60) Provisional application No. 63/298,116, filed on Jan. 10, 2022.

(51) Int. Cl.

| | |
|---|---|
| ***G02F 1/1333*** | (2006.01) |
| ***C09K 19/02*** | (2006.01) |
| ***C09K 19/52*** | (2006.01) |
| ***G02F 1/1334*** | (2006.01) |

(52) U.S. Cl.
CPC ........ *C09K 19/0225* (2013.01); *C09K 19/025* (2013.01); *C09K 19/52* (2013.01); *G02F 1/1334* (2013.01)

(58) Field of Classification Search
CPC .. C09K 19/52; C09K 19/0225; C09K 19/025; G02F 1/1333; G02F 1/1334
See application file for complete search history.

(56) References Cited

U.S. PATENT DOCUMENTS

| | | | | |
|---|---|---|---|---|
| 5,235,437 | A | 8/1993 | Katagiri et al. | |
| 5,327,263 | A | 7/1994 | Katagiri et al. | |
| 9,703,050 | B2 * | 7/2017 | Chan | G02B 6/136 |
| 2012/0000974 | A1 | 1/2012 | Hung et al. | |
| 2015/0185422 | A1 | 7/2015 | Chan et al. | |
| 2016/0160557 | A1 | 6/2016 | Kim et al. | |
| 2025/0075128 | A1 * | 3/2025 | Glaser | C09K 19/0225 |

FOREIGN PATENT DOCUMENTS

| | | | | |
|---|---|---|---|---|
| GB | 2303464 | A | 2/1997 | |
| JP | H06167723 | A | 6/1994 | |
| KR | 101981068 | B1 | 5/2019 | |
| WO | WO-2023250192 | A2 * | 12/2023 | C09K 19/10 |

OTHER PUBLICATIONS

"Volume." Merriam-Webster.com Dictionary, Merriam-Webster, https://www.merriam-webster.com/dictionary/volume. Accessed Nov. 4, 2025. (Year: 2025).*

Daubeny, R. de P. et al. "The crystal structure of polyethylene terephthalate" Proc. of the Royal Society of London. Series A, Mathematical and Physical Sciences, vol. 226, No. 1167 (Dec. 7, 1954), pp. 531-542 (12 pages).

PCT/US2023/010510 International Search Report and Written Opinion dated Jun. 29, 2023, 14 pages.

Supplementary European Search Report for EP Patent Application No. 23737683.5 dated Nov. 26, 2025, 7 pages.

* cited by examiner

*Primary Examiner* — Geraldina Visconti
(74) *Attorney, Agent, or Firm* — Cozen O'Connor

(57) ABSTRACT

Composite materials and devices including composite materials are disclosed. Exemplary composite materials include a porous material and ferroelectric nematic liquid crystal within pores of the porous material. The composite materials can be used in a variety of applications, such as capacitors, information storage and processing, actuators, sensors, electro-caloric devices, energy storage and/or conversion devices utilizing piezoelectric effects. The porous material can be a solid, a polymer, glassy, crystalline, amorphous, foam, an aerogel or ceramic.

20 Claims, 6 Drawing Sheets

COMPOSITE MATERIALS BASED ON FERROELECTRIC NEMATIC LIQUID CRYSTALS AND DEVICES INCLUDING SAME

CROSS REFERENCE TO RELATED APPLICATIONS

This application claims the benefit of U.S. Provisional Application Ser. No. 63/298,116 filed on Jan. 10, 2022, and entitled Superparaelectric composite materials based on ferroelectric nematic liquid crystals, the content of which is hereby incorporated herein by reference to the extent such content does not conflict with the present disclosure.

FEDERALLY-SPONSORED RESEARCH

This invention was made with government support under grant number DMR1710711, awarded by the National Science Foundation. The government has certain rights in the invention.

FIELD OF THE DISCLOSURE

The present disclosure generally relates to composite materials comprising a ferroelectric nematic liquid crystal. More particularly, examples of the disclosure relate to composite materials comprising one or more porous materials and ferroelectric nematic liquid crystal within pores of the one or more porous materials.

BACKGROUND OF THE DISCLOSURE

Ferroelectricity in liquids was predicted in the 1910s by P. Debye and M. Born, who applied the Langevin-Weiss model of ferromagnetism to the orientational ordering of molecular electric dipoles. Recently, interest in nematic ferroelectricity has increased. Nematic ferroelectricity presents opportunities for novel liquid crystal science and technology thanks to its unique combination of macroscopic polar ordering and fluidity.

Any discussion of problems and solutions set forth in this section has been included in this disclosure solely for the purpose of providing a context for the present disclosure and should not be taken as an admission that any or all of the discussion was known at the time the invention was made.

SUMMARY OF THE DISCLOSURE

This summary is provided to introduce a selection of concepts. This summary is not intended to necessarily identify key features or essential features of the claimed subject matter, nor is it intended to be used to limit the scope of the claimed subject matter.

Embodiments of the disclosure relate to composite material comprising ferroelectric nematic liquid crystal. As set forth in more detail below, the composite material can be used to form a variety of devices with desired properties, such as high dielectric constant and/or desired electro-optical properties.

In accordance with examples of the disclosure, a composite material includes a first porous material comprising pores, said pores comprising a volume, and ferroelectric nematic liquid crystal, wherein the volume of the pores of said first porous material contains the ferroelectric nematic liquid crystal. The pores can be filled or substantially filled with the ferroelectric nematic liquid crystal. In accordance with various embodiments of the disclosure, the first porous material can be solid. In accordance with additional embodiments, the first porous material can be a polymer, can be glassy, can be crystalline, can be amorphous, can be a foam, can be an aerogel, can be a porous ceramic, or the like. The composite material can include additional porous material and/or ferroelectric nematic liquid crystal. The second porous material can be the same or different from the first porous material.

In accordance with additional examples of the disclosure, a composite material (e.g., a dielectric media) comprises a ferroelectric nematic liquid crystal and a solid material, said solid material dispersed in the liquid crystal as particulates. The solid material can be or include, for example, ferroelectric or superparaelectric particles. The dispersion can be formed by, for example, phase separation, photo-polymerization, or the like. In accordance with further examples, the dispersion is stabilized by amphiphilic molecular components.

Composite materials and/or dielectric media described herein can be used to form, for example, a semiconductor structure or device, a dielectric structure, a capacitor, an electro-optic device, an energy storage device, an energy conversion device, an information storage and processing device, an actuator, a sensor, an electro-caloric device, an electric to mechanical energy conversion through piezoelectric effects device, or the like.

BRIEF DESCRIPTION OF DRAWINGS

A more complete understanding of the embodiments of the present disclosure may be derived by referring to the detailed description and claims when considered in connection with the following illustrative figures.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

In this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, the value ±10% (e.g., vol. at. or mass %), or the like. Further, in this disclosure, the terms "comprising," "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings.

The present disclosure generally relates to composite materials that include ferroelectric nematic liquid crystal. The composite materials can be multifunctional, such that the composite materials can be used in a variety of applications (e.g., in capacitors, actuators, or electro-optic devices). In accordance with various examples, the composite material can be a dielectric material—e.g., a dielectric material having a dielectric constant (relative permittivity) greater than 10 or between about 2 and about 5000.

Figure 1:
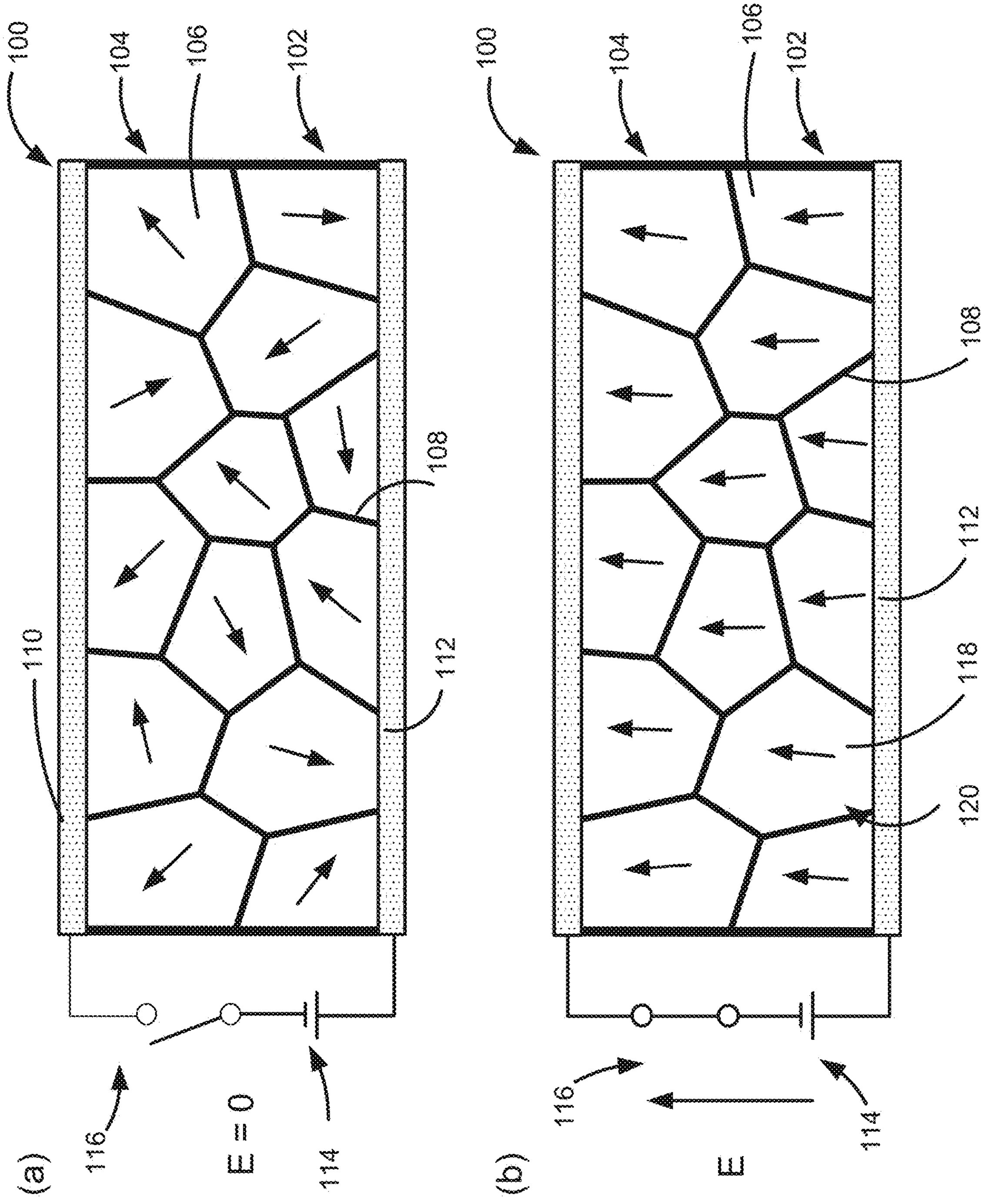
FIG. 1 illustrates a composite material in accordance with examples of the disclosure.

With reference to the drawing figures, FIGS. 1 (*a*) and (*b*) illustrate a device 100 including a composite material 102 in accordance with examples of the disclosure. In the illustrated example, composite material 102 includes a porous material or medium 104 and ferroelectric nematic liquid crystal 106. As illustrated, porous material 104 includes walls 108. Device 100 can also include a first electrode 110, a second electrode 112, a voltage source 114, and a switch 116.

In accordance with examples of the disclosure, porous medium or material 104 contains ferroelectric nematic liquid crystal 106. In these cases, domain walls 108 of porous medium 104 structure ferroelectric nematic liquid crystal 106 to produce a morphology comprising randomly oriented, ferroelectric domains, as illustrated in FIG. 1(*a*). In this case, composite material 102 has zero net electric polarization in the absence of an applied electric field. If a sufficient electric field (e.g., about $10^3$ to about $10^6$ or about $10^7$ to about $10^9$ V/m) is applied, the polarization reorients, composite material 102 acquiring a large net electric polarization, thereby exposing walls 108 of porous medium 104 to large electric fields, enabling walls 108 to contribute to the effective dielectric constant, as illustrated in FIG. 1(*b*). Moreover, the polar domains of the composite material may be oriented by a strain field in the absence of an applied electric field, resulting in large piezoelectric effects, and, conversely, mechanical strain may be generated by application of an electric field. These materials therefore have a variety of potential device applications, including dielectric structures, high-energy-density capacitors, actuators and transducers, sensors, electro-optic devices, electro-caloric devices, electric to mechanical energy conversion through piezoelectric effects device, other devices noted herein, and the like.

With reference again to FIG. 1, porous material 104 includes a plurality of pores 118 comprising a volume 120. Pores 118 can be at least partially, or can be entirely, defined by walls 108. Volume 120 can be filled or substantially (e.g., at least 90, 95, or 99%) filled with the ferroelectric nematic liquid crystal. The pores can be interconnected.

Porous material 104 can be a solid. By way of examples, porous material 104 can be a polymer (e.g., polyethylene, silicone, polyvinylidene fluoride, cellulose, polypeptide), a glassy material (e.g., silicate, borosilicate, or aluminosilicate glass, glassy polymer), a crystalline material (e.g., silicon, silica, alumina, titanate, perovskite, $LiNbO_3$), an amorphous material (e.g., amorphous carbon, amorphous silicon, amorphous metal), a foam (e.g., polystyrene or vinyl foam, metal oxide foam, liquid emulsion), an aerogel (e.g., formed from silica, carbon, or metal oxide), or a porous ceramic (e.g., zeolite, anopore membrane, honeycomb ceramic, diatomite). A porosity of porous material 104 can range from about 0.05 to about 0.4 or about 0.5 to about 0.95. A pore size or an average pore size of pores of porous material 104 can range from about 2 nm to about 50 nm or about 0.1 micrometer to about 10 micrometers.

Figure 6:
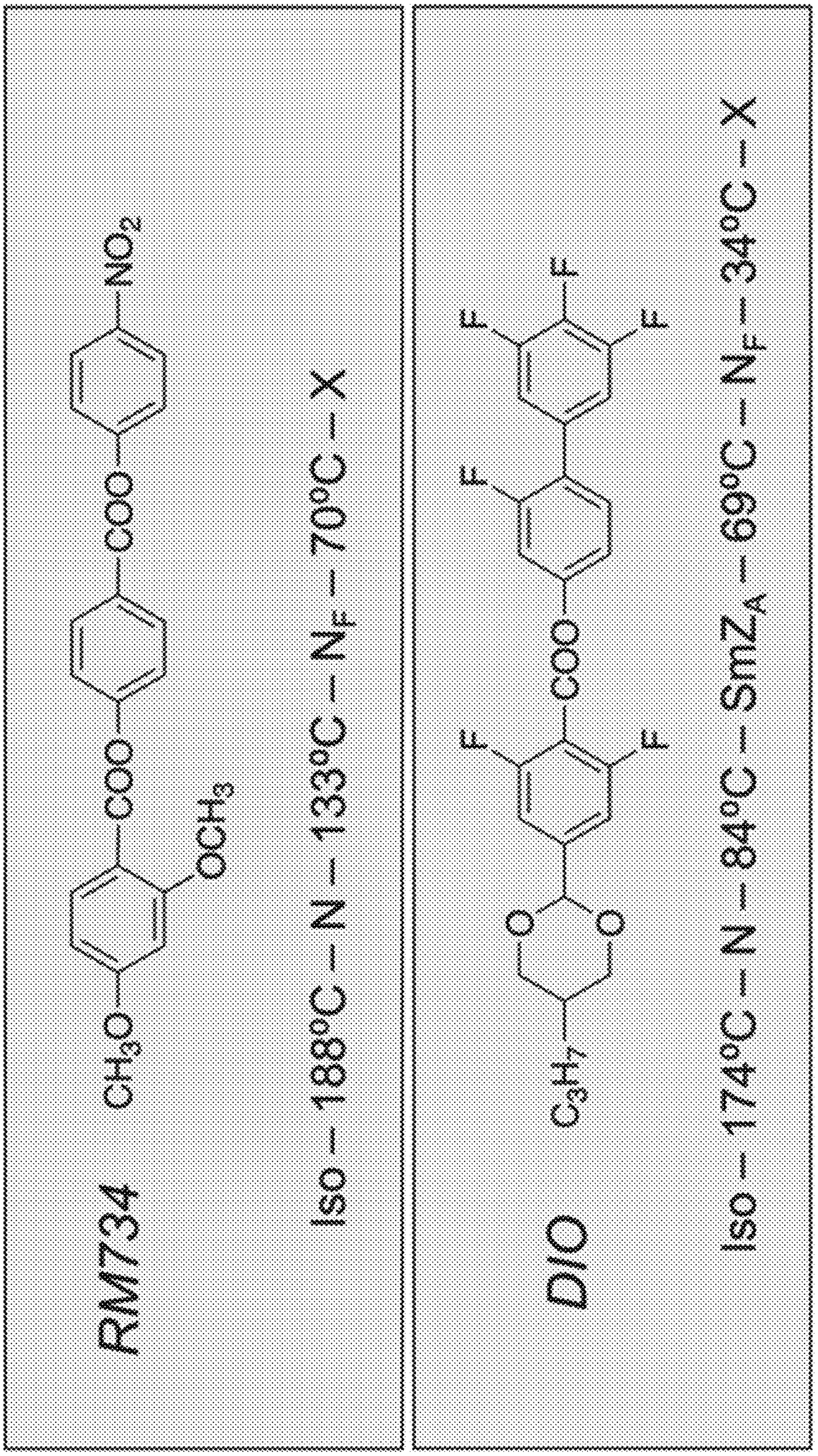
FIG. 6 illustrates exemplary ferroelectric nematic liquid crystal forming molecules.

Ferroelectric nematic liquid crystal 106 can include any suitable ferroelectric nematic liquid crystal material. By way of example, ferroelectric nematic liquid crystal 106 can include ferroelectric nematic liquid crystal forming molecules, such as RM734 or DIO, as illustrated in FIG. 6.

Electrodes 110, 112 can be formed of any suitable conductive material, such as gold, copper, aluminum, or indium tin oxide (ITO).

Composite material 102 can be thought of as analogous to a class of inorganic or polymeric materials termed "relaxor ferroelectrics," which are solid-state ferroelectrics with randomly oriented nanometer-scale polar domains. This isotropic domain structure may be achieved in a variety of ways, including rapid quenching into the ferroelectric state to obtain a polycrystalline morphology with nanometer-scale ferroelectric domains, or formation of nanostructured composite materials comprising randomly oriented nanometer-scale ferroelectric domains in a nanoporous host material. The term "superparaelectric" has been introduced recently to describe solid-state relaxor ferroelectrics comprising nanometer-scale domains with local polar order, which have been used to create dielectric capacitors with ultra-high energy densities and high efficiencies [Y H. Chu, Science 374, 33-34 (2021); H. Pan et al., Science 374, 100-104 (2021)].

A key difference between previously described relaxor ferroelectrics and the composite materials described here is that the ferroelectric component used in these composite materials is a fluid ferroelectric nematic liquid crystal instead of a solid-state inorganic or polymeric ferroelectric material. A key advantage of ferroelectric nematic materials is the ease of processing arising from their fluidity. Ferroelectric nematics can be readily infused into or integrated with a wide variety of porous media, including, for example, aerogels, polymer networks, inverse opals, zeolites, and nanoporous glasses, ceramics, and the like facilitating materials design and optimization and potentially reducing the cost of materials fabrication.

Another key advantage derives from the finding that a structurally polar surface can be used to control the polar alignment of an adjacent volume of ferroelectric nematic material, so that intrinsic structural polarity of the surface of a pore may impose a preferred polar alignment on the volume of ferroelectric material within the pore. This effect may enable each ferroelectric domain in the composite material to "remember" its zero-field polar orientation, thereby reducing hysteresis and associated energy losses in capacitor applications. Such surface polarity may be achieved in porous media composed of polar polymers or of inorganic materials with polar surface structure (including solid-state ferroelectrics), or by chemical functionalization of the internal surface of the porous medium (e.g., functionalized using one or more of silane or thiol self-assembled monolayers, oligomers, polymers, block copolymers). A further potential advantage of the composite material described herein derives from the fast response of the fluid ferroelectric nematic to applied electric fields, which may enable capacitors based on these materials to be charged and discharged more rapidly.

While high-efficiency capacitive energy storage generally requires materials with small hysteresis, composite materials based on ferroelectric nematics with large hysteresis are also of interest, as these are materials with intrinsic memory, in which the state of the material is history-dependent. In other words, the materials properties of ferroelectric nematic composites may depend on the detailed history of the material, including its history of field treatment (e.g., by applied electric, magnetic, and optical fields as well as mechanical stress and strain) and variation of thermodynamic parameters (e.g., temperature, pressure, and chemical potential).

Such materials with intrinsic memory represent a novel type of programmable matter, with a broad range of potential applications, including as memory elements with optical, electrical, or mechanical readout for information storage and processing, e.g., for optical and neuromorphic computing applications, as shape memory materials with programmable shape changes driven by temperature variations, by chemical stimuli, or by optical or electrical fields, e.g., for soft robotics, and a variety of sensor and actuator applications and devices. Such devices can be schematically illustrated as device 100.

In accordance with further examples of the disclosure, device 100 and composite material 102 may be used for energy conversion as well as energy storage devices. One approach involves creating a porous medium containing a ferroelectric nematic liquid crystal in the limit where the electric threshold for switching is large. In a system with volume V and pores of dimension a, the typical surface energy per unit contact area between the $N_F$ liquid crystal and the porous medium is W. The overall surface energy of the system is proportional to $$\frac{V}{a^3} \times W \times a^2 = \frac{VW}{a},$$

which indicates that the switching threshold determined by the surface energy increases with decreasing pore dimension. The elastic energy density due to distortions of the liquid crystal director field is proportional to $Ka^{-2}$, and this also contributes to the energy threshold for electric switching.

We now estimate some experimentally relevant quantities using typical parameter values for the liquid crystal properties. Consider a uniformly aligned bulk ferroelectric nematic material whose polar molecular orientation (polar director) is pinned by surface anchoring within a porous structure, and which is subject to an applied field E. We require that the surface and bulk elastic energies create a deep enough energy well to prevent reorientation of the polarization field in response to the depolarization field. A zeroth order energy analysis is proposed: The electric energy density of the polarization in the applied field E is $f_p=-P\cdot E$ and the distortion energy density of a porous unit cell is $f_{elastic}=K/a^2$. The maximum depolarization field comes from the polarization charge on the electrode surface $E=P/\varepsilon$. For simplicity, we take $\varepsilon=\varepsilon_0$. Then with $P=6\ \mu C/cm^2$, we obtain $f_p=406\ J/cm^3$. For $f_{elastic}=f_p$, and taking $K=10^{-11}$ N, we have a=16 nm. To maintain the surface orientation in the presence of the elastic torque, we need $$W = \frac{K}{a} = 0.63 \times 10^{-3}\ \mathrm{J/m^2}.$$

As shown in previous studies, the polar surface energy of a typical polymer-aligned cell is around $W=3\times10^{-3}\ J/m^2$. Thus, the required polarization pinning could be achieved with pore dimensions around 10 nm (or between about 2 nm and about 50 nm) and a polymer surface treatment (e.g., using polyimide, nylon, or polypeptide) or some other treatment (e.g., silane or thiol self-assembled monolayer) that provides sufficient surface anchoring energy.

Figure 2:
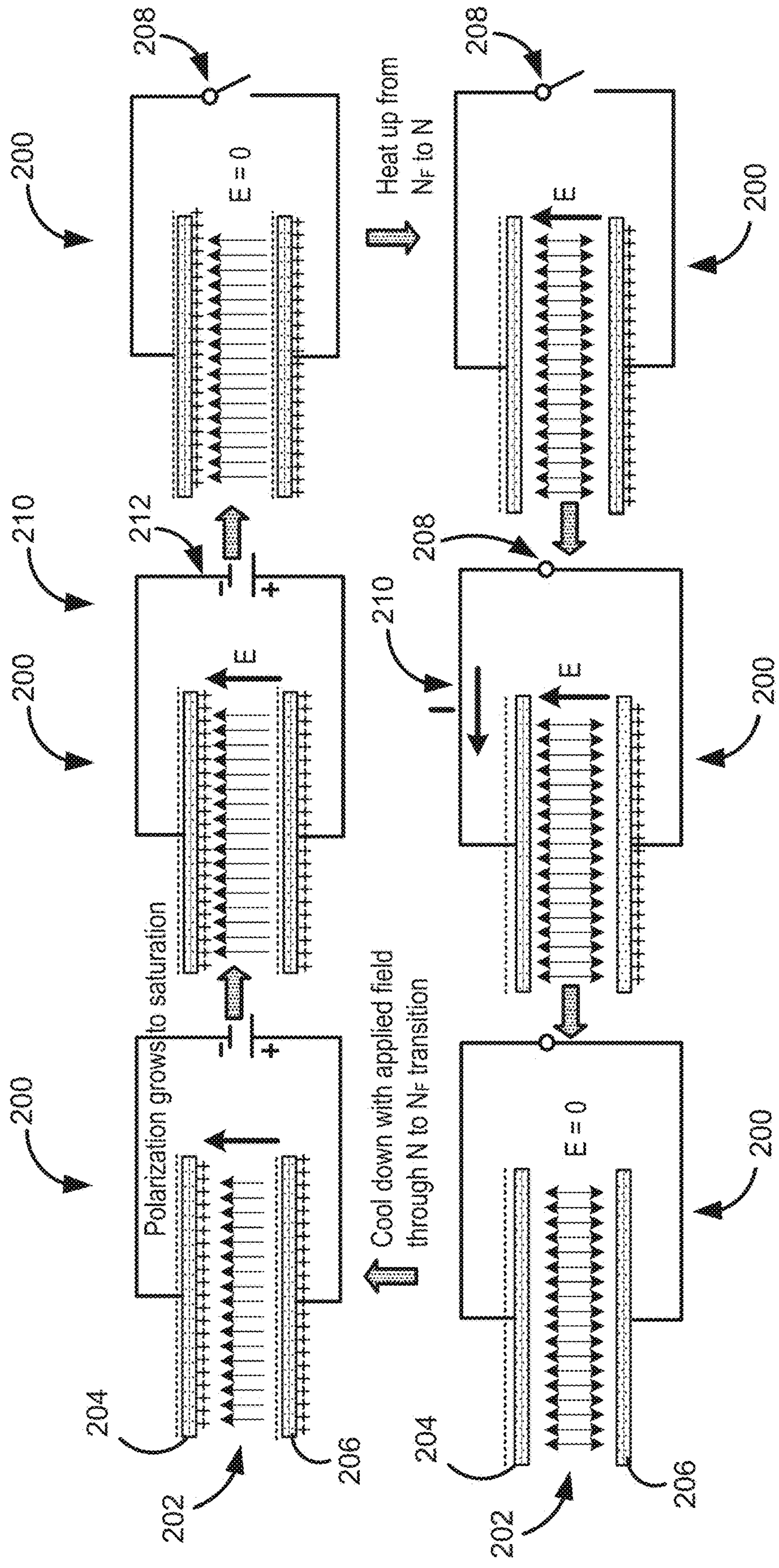
FIG. 2 illustrates a device in accordance with additional examples of the disclosure.

Given a structure with an energy barrier that is large enough to pin the polarization direction (due to polar anchoring at internal (pore) surfaces), which we term a polar-aligned volume, FIG. 2 shows a potential energy storage device 200 that can be charged and discharged under environmental temperature variations (e.g., between day and night) and used to do electrical work.

Similar to device 100, device 200 include composite material 202. Composite material 202 can be the same or similar to composite material 102. FIG. 2 illustrates a thermal to electrical energy conversion process in a polar-aligned volume (composite material 202) of device 200.

Composite material 202 fills the gap between two conducting electrodes 204, 206, with no alignment layers. The thermal to electrical energy conversion process is shown schematically, starting from the top left in the figure and proceeding clockwise. The macroscopic, uniform polarization in the $N_F$ phase, which is stabilized by polar alignment at the surfaces, produces a polarization surface charge and a resulting depolarization field. This field creates a voltage drop between the electrodes 204, 206 and, when a switch 208 between electrodes 204, 206 is closed (top middle diagram), current flows in an external circuit 210 including a voltage source 212 to neutralize the polarization charge. This is the first discharging process. After some time, the free charge balances the polarization charge and the voltage difference between the electrodes approaches zero (top right diagram). Then switch 208 is opened and the liquid crystal is heated from the $N_F$ phase into the N phase, resulting in the disappearance of the polarization charge. The remaining free charge on the electrodes produces a voltage drop between electrodes 204, 206, which is the first charging process (bottom right diagram). Next switch 208 is closed and current flows in external circuit 210 to neutralize the free charge (bottom middle diagram). This is the second discharging process. In the final step, switch 208 is opened and the sample is cooled from the N phase to the $N_F$ phase. The polarization aligns in the same direction as before due to the polar surface anchoring (top left diagram). This is the second charging process.

We can estimate the achievable energy density in the charged state (FIG. 2, top left) as follows. First, we compute the total electrostatic energy F:

$$F = \frac{Q^2}{2C} = \frac{Q^2 d}{2\varepsilon A} = \frac{P^2 Ad}{2\varepsilon} = \frac{P^2}{2\varepsilon}V,$$

where Q is the surface polarization charge, C is the capacitance of the liquid crystal layer of thickness d, A is the area of the bounding surfaces, and V the volume of the liquid crystal layer. The energy density (the electrostatic energy density etc.) $f_E$ is then given by $$f_E = \frac{P^2}{2\varepsilon} = \frac{P^2}{2\varepsilon_0\varepsilon_r}$$

Assuming a ferroelectric polarization P=6 μC/cm$^2$ and a relative permittivity of $\varepsilon_r$=1, the energy density is 203 J/cm$^3$. This is one order of magnitude smaller than in currently available high energy density batteries (see Table 1) however the whole charging process depicted in FIG. 2 is accomplished simply by heating and cooling the device. Room-temperature ferroelectric nematic phases have already been demonstrated in neat materials and in mixtures, so the transition could be driven by variations in environmental temperature, e.g., between day and night.

TABLE 1

Energy densities of currently available batteries.

| Battery chemistry | Volumetric energy density (J/cm$^3$) |
| --- | --- |
| Alkaline | 1200 |
| Lithium | 2880 |
| Zinc-air | 3780 |

Combining $N_F$ liquid crystals with conventional dielectric materials has the potential to achieve much higher energy storage capacities than currently obtainable. The electrostatic energy stored in a parallel plate capacitor with a dielectric layer of thickness d is $$f_E = \frac{1}{2}DE = \frac{1}{2}\varepsilon_0\varepsilon_r E^2.$$

This energy density can be increased by filling the thickness partially with $N_F$ material.

In these cases, the composite material comprises ferroelectric nematic regions interspersed with regions of a second, dielectric material. Said ferroelectric nematic regions exhibit the polarization field P(r), which, in the presence of an electric field is reoriented to be parallel to the field. This reorientation deposits polarization charge on interfaces between the ferroelectric nematic regions and those of the second material. With applied voltage, up to Vsat=P/C, where C is the capacitance/area of the dielectric layer, the field inside the $N_F$ liquid crystal is screened by reorientation of the polarization. As a result, in an applied voltage, the electric field in the composite material is confined to the second material. Thus the polarization charge applies an electric field to the regions of the second material, which can be as large as E=P/ε. This field is applied to the second material without contact of free electrons or holes with the second material, the ferroelectric nematic enabling charge transport by facilitating the displacement of bound charge not free charge. This mechanism enables charging of the second material to high voltages, avoiding electrical breakdown produced by the cascade processes of free charge carriers.

Thus the achievable energy density of conventional thin film capacitors is limited by the breakdown field of the dielectric layer (in the best case ~5 MV/cm, as shown in Table 2). An advantage of $N_F$ composite materials, such as those described herein, is that the dielectric material is largely in contact with non-conducting $N_F$ liquid crystal rather than with the electrodes. The resulting absence of charge transport could potentially increase the breakdown field to a much higher value than in known thin film dielectrics like those shown in the Table 2. In an $N_F$ composite, the field limit is set by the maximum surface polarization charge: $E_{max}$=P/$\varepsilon_0\varepsilon_r$=67 MV/cm ($\varepsilon_r$=1), which is about 10 times bigger than the best thin film capacitors. This is especially significant for energy storage, since in $N_F$ composites the energy density $f_E \propto E^2$, which implies potentially a 100 times larger energy density.

TABLE 2

Highest performance data exemplars for dielectric energy storage systems of different materials, Including the Bulky BOPP, Perovskite Relaxor Ferroelectric (RFE) and Antiferroelectric (AFE) Thin Films, and Ferroelectric (FE) and AFE HfO2 and ZrO2-based thin films.

| material | type | film thickness (nm) | ESD (J cm$^{-3}$) | $E_{BD}$ (MV/cm) |
| --- | --- | --- | --- | --- |
| Polymer Dielectric-Based | | | | |
| BOPP | polymer | 3000 | 2-3 | 6 |
| Oxide Perovskite Ferroic-Based | | | | |
| $0.25BiFeO_3$—$0.3BaTiO_3$—$0.45SrTiO_3$ | RFE | 200-800 | 112 | 4.9 |
| Mn-doped $BiFeO_3$—$BaTiO_3$ | RFE | 350 | >80 | 3.0 |
| $0.5Ba(Zr_{0.2}Ti_{0.8})O_3$—$0.5(Ba_{0.7}Ca_{0.3})TiO_3/HfO_2:Al_2O_3$ | RFE | 160 | 99.8 | 0.8 |
| $Ba(Zr_{0.2}Ti_{0.8})O_3$ | RFE | 350 | 133 | 5.7 |
| $0.99(0.94Bi_{0.5}Na_{0.5}TiO_3$—$0.06BaTiO_3)$—$0.01BiMnO_3$ | RFE | 400 | 57 | 2.7 |
| $PbZr_{0.52}Ti_{0.48}O_3/Al_2O_3/PbZr_{0.52}Ti_{0.48}O_3$ | FE | 330 | 64 | 5.5 |
| $Pb_{0.99}Nb_{0.02}(Zr_{0.55}Sn_{0.40}Ti_{0.05})_{0.98}O_3$ | AFE | 700 | 39 | 1.0 |
| $Pb_{0.88}Ca_{0.12}ZrO_3$ | AFE | 300 | 50 | 2.8 |
| (Pseudo)binary $HfO_2/ZrO_2$-Based | | | | |
| $Si:Hf_{0.5}Zr_{0.5}O_2$ | AFE | 10 | >50 | 4 |
| $Si:HfO_2$ | AFE | 10 | 61.2 | 4.5 |
| $ZrO_2$ | AFE | 9.6 | 37 | ~4 |
| $Al_2O_3:HfO_2/ZrO_2$ | FE | 7 | 54.3 | 5 |
| $Ta_2O_5/Hf_{0.5}Zr_{0.5}O_2$ | FE | 25 | >100 | ~7 |

ESD: energy storage density; EBD: dielectric breakdown field. [From J. P. B. Silva et al., ACS Energy Lett. 6, 2208-2217 (2021)].

Figure 3:
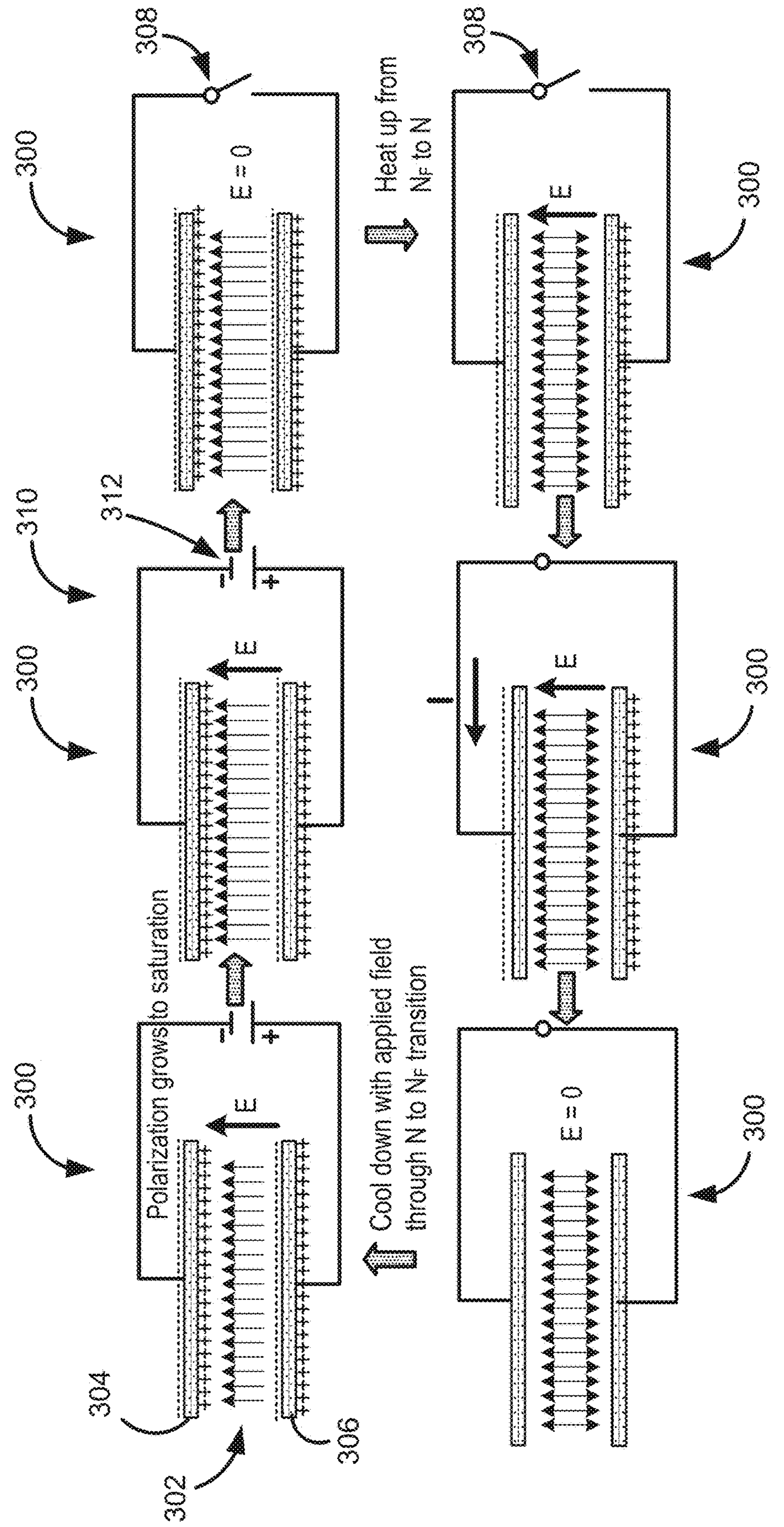
FIG. 3 illustrates another device in accordance with examples of the disclosure.

Achieving such a polar-aligned volume could be technically difficult. FIG. 3 illustrates an alternative scheme that employs a more easily achievable charging and discharging cycle. This process only requires a nonpolar-aligned volume. In other words, the aligning surfaces need only maintain nematic-like director alignment, with no preference for which way the polarization orients locally. In this case, the pore dimensions could be larger, with a in the range 1-10 mm. The ferroelectric polarization is aligned by applying an aligning field E as small as 1 V/mm during cooling. The total energy needed to align the material is $F_{align}$=EdQ=EAdP, giving an energy density loss of $f_{align}$=EP=$6\times10^{-5}$ J/$cm^3$ for E=1 V/mm. This cycle is shown in FIG. 3, starting from the top right and proceeding clockwise using device 300. Device 300 can be the same or similar to device 200. Specifically, device 300 can include composite material 302 (which can be the same or similar to composite material 202), electrodes 304, 306, switch 308, and voltage source 312. Electrodes 304, 306, switch 308, and voltage source or power supply 312 can be as described above in connection with FIG. 2.

First, device 300 is heated from the $N_F$ phase to the N phase with switch 308 open, which results in the disappearance of the polarization charge at the bounding surfaces. The remaining free charge produces a voltage drop that drives a current in external circuit 310 when switch 308 is closed (bottom middle diagram). After all the free charge is neutralized, the sample is cooled down from the N phase to the $N_F$ phase in the presence of a small aligning field supplied by external power supply—e.g., voltage source 312. Power supply 312 can continually supply current to electrodes 304, 306 to balance the polarization charge. As a result, the field in the sample is always E. The absence of a large depolarization field relaxes the requirement for strong volume alignment.

Figure 4:
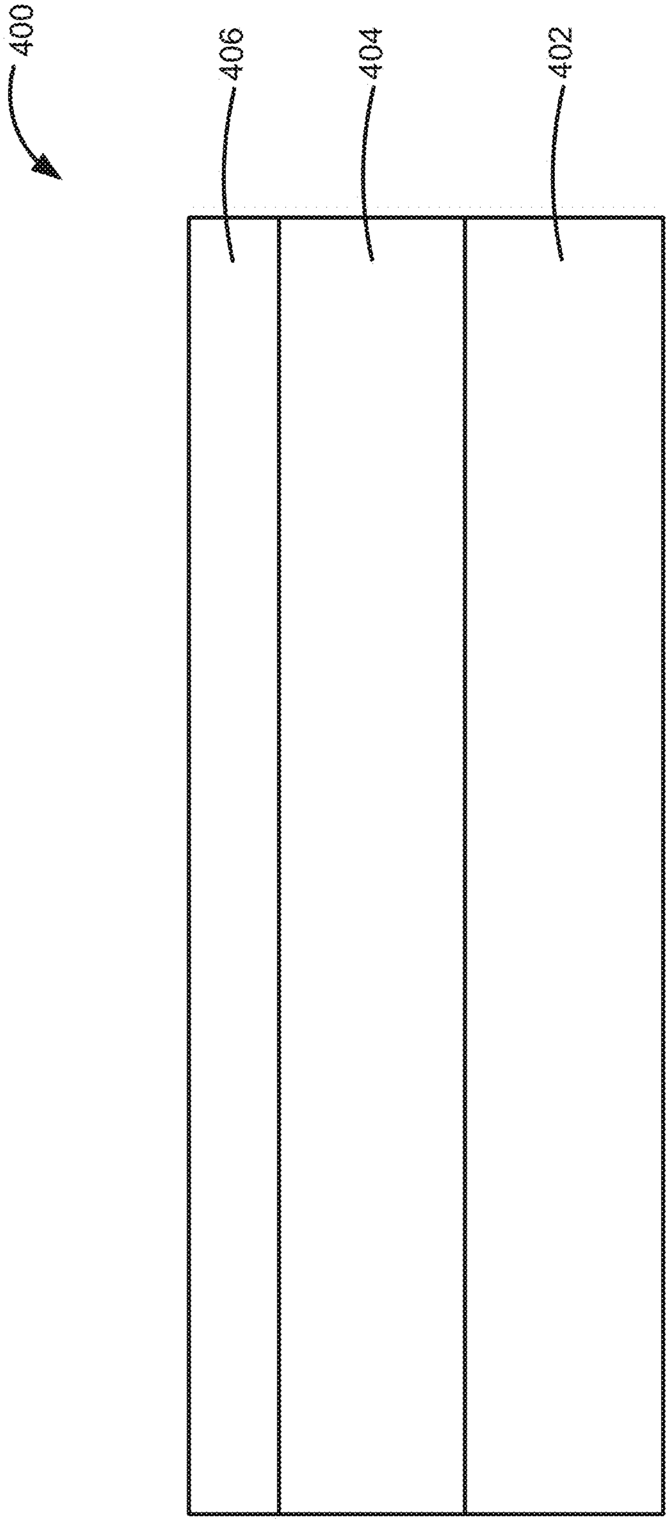
FIG. 4 illustrates a semiconductor device or structure in accordance with examples of the disclosure.

FIG. 4 illustrates a semiconductor device or structure 400 in accordance with yet additional examples of the disclosure. In the illustrated example, semiconductor device 400 includes a substrate 402, a composite material 404, and an additional layer 406.

Substrate 402 can include any underlying material or materials that can be used to form, or upon which, a device, a circuit, or a film can be formed. A substrate can include a bulk material, such as silicon (e.g., single-crystal silicon), other Group IV materials, such as germanium, or other semiconductor materials, such as Group II-VI or Group III-V semiconductor materials, and can include one or more layers overlying or underlying the bulk material. Further, the substrate can include various features, such as recesses, protrusions, and the like formed within or on at least a portion of a layer of the substrate. By way of examples, a substrate can include semiconductor material. The semiconductor material can include or be used to form one or more of a source, drain, or channel region of a device. The substrate can further include an interlayer dielectric (e.g., silicon oxide) and/or a high dielectric constant material layer overlying the semiconductor material. In this context, high dielectric constant material or high k dielectric material is material having a dielectric constant greater than the dielectric constant of silicon dioxide.

Composite material 404 can be or include any composite material or dielectric medium described herein, such as composite material 102.

Additional layer 406 can include any suitable layer. By way of examples, additional layer 406 can be or include a conductive layer, such as a metallic layer.

In accordance with additional examples of the disclosure, a composite material, or more particularly, dielectric medium comprises a ferroelectric nematic liquid crystal and a solid material, said solid material (e.g., dispersed) in the liquid crystal as particulates. The solid material can be comprised of ferroelectric or superparaelectric particles, such as $LiNbO_3$, $BaTiO_3$, or lead zirconate titanate (PZT).

In accordance with examples of the disclosure, the dispersion is formed by phase separation or photo-polymerization. The dispersion can be stabilized by amphiphilic molecular components, such as anionic or cationic lipids, non-ionic surfactants, or ionic liquids.

Figure 5:
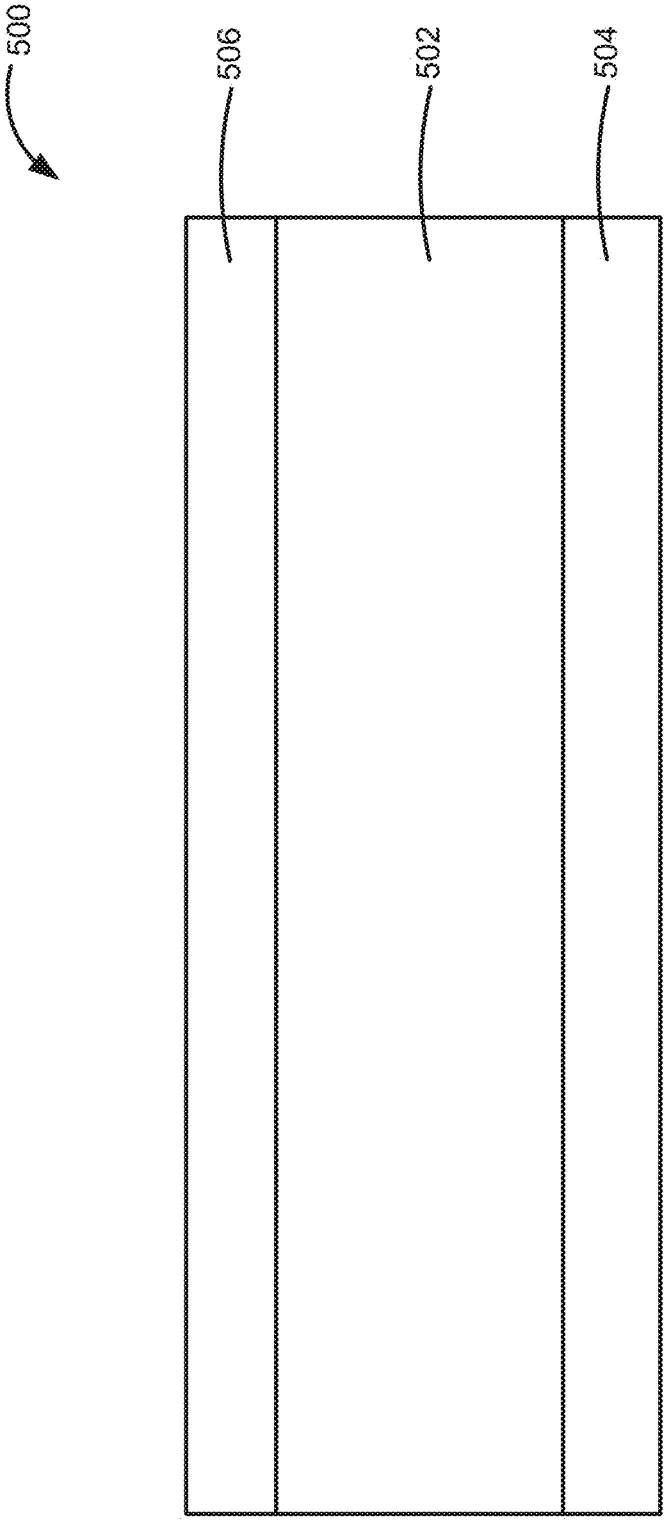
FIG. 5 illustrates another device in accordance with examples of the disclosure.

FIG. 5 illustrates a device 500 including composite material/dielectric material 502, which includes the solid material dispersed in the liquid crystal, and electrodes 504 and 506. Electrodes 504 and 506 can be the same or similar to electrodes 110, 112.

Device 500 can be used for energy storage and/or energy conversion schemes utilizing various energy sources. For example, ferroelectric nematic materials doped with photoresponsive dye molecules can be driven from the $N_F$ to the N phase (or to the isotropic phase) under the action of light (a photoinduced phase transition), enabling conversion of electromagnetic energy (e.g., sunlight) into electrical energy. A very similar 'charge pump' approach utilizing ferroelectric smectic liquid crystals has been proposed previously [M. Knežević and M. Warner, "Photoferroelectric solar to electrical conversion," Applied Physics Letters 102, 043902 (2013)]. The present invention differs from this prior art in that it utilizes composite materials comprising ferroelectric nematic materials in porous media or dispersions to achieve high-efficiency energy conversion and makes use of the recently discovered polar anchoring phenomenon to realize volumetric polar alignment of the ferroelectric nematic material.

The example embodiments of the disclosure described above do not limit the scope of the invention, since these embodiments are merely examples of the embodiments of the invention, which is defined by the appended claims and their legal equivalents. For example, examples of the disclosure can include composite materials that include a plurality of layers having voids or one or more pores therebetween that are at least partially filled with ferroelectric nematic liquid crystal or dielectric medium as described herein. Any equivalent embodiments are intended to be within the scope of this invention. Various modifications of the disclosure, in addition to those shown and described herein, such as alternative useful combinations of the elements described, may become apparent to those skilled in the art from the description. Such modifications and embodiments are also intended to fall within the scope of the appended claims.

The invention claimed is:

1. A composite material comprising:

a porous material comprising pores; and ferroelectric nematic liquid crystal, wherein the pores of said porous material contain the ferroelectric nematic liquid crystal.

2. The composite material as in claim 1, wherein said pores of said porous material are substantially filled with the ferroelectric nematic liquid crystal.

3. The composite material as in claim 1, wherein said porous material is a solid.

4. The composite material as in claim 1, wherein said porous material is a polymer.

5. The composite material as in claim 1, wherein said porous material is glassy.

6. The composite material as in claim 1, wherein said porous material is crystalline.

7. The composite material as in claim 1, wherein said porous material is amorphous.

8. The composite material of claim 1, wherein said porous material is a foam.

9. The composite material of claim 1, wherein said porous material is an aerogel.

10. A composite material of claim 1, wherein said porous material is a porous ceramic.

11. An electro-optic device, said device comprising the composite material of claim 1.

12. A semiconducting structure comprising:

a porous solid material, the porous solid material comprising pores filled or substantially filled with ferroelectric nematic liquid crystal.

13. A dielectric structure comprising a porous, solid, and electrically insulating material, the porous, solid, and electrically insulating material comprising pores that contain ferroelectric nematic liquid crystal.

14. A capacitor comprising electrodes and a dielectric medium, said dielectric medium comprising a porous, solid, electrically insulating material comprising pores that contain ferroelectric nematic liquid crystal.

15. A device comprising the composite material or dielectric medium of claim 1.

16. The device of claim 15, wherein the device is an energy storage device.

17. The device of claim 15, wherein the device is an energy conversion device.

18. The device of claim 15, wherein the device is an information storage and processing device.

19. The device of claim 15, wherein the device is an actuator, sensor, electro-caloric device, or electric to mechanical energy conversion through piezoelectric effects device.

20. The composite material of claim 1, wherein the composite material is a dielectric material.

* * * * *